United States Patent
Takeuchi et al.

(10) Patent No.: US 9,903,612 B2
(45) Date of Patent: Feb. 27, 2018

(54) SOLAR HEAT COLLECTION TUBE

(71) Applicants: KABUSHIKI KAISHA TOYOTA JIDOSHOKKI, Kariya-shi, Aichi-ken (JP); EAGLE INDUSTRY CO., LTD., Tokyo (JP)

(72) Inventors: Norihito Takeuchi, Kariya (JP); Toshiaki Iwa, Tokyo (JP); Yoshihiro Ogawa, Tokyo (JP)

(73) Assignees: KABUSHIKI KAISHA TOYOTA JIDOSHOKKI, Kariya-shi, Aichi-ken (JP); Eagle Industry Co., Ltd., Minato-ku, Tokyo (JP)

( * ) Notice: Subject to any disclaimer, the term of this patent is extended or adjusted under 35 U.S.C. 154(b) by 440 days.

(21) Appl. No.: 14/418,028

(22) PCT Filed: Jul. 22, 2013

(86) PCT No.: PCT/JP2013/069780
§ 371 (c)(1),
(2) Date: Jan. 28, 2015

(87) PCT Pub. No.: WO2014/021127
PCT Pub. Date: Feb. 6, 2014

(65) Prior Publication Data
US 2015/0300690 A1    Oct. 22, 2015

(30) Foreign Application Priority Data
Aug. 1, 2012  (JP) ................... 2012-171290

(51) Int. Cl.
*F24J 2/50*    (2006.01)
*F24J 2/05*    (2006.01)
(Continued)

(52) U.S. Cl.
CPC ............... *F24J 2/055* (2013.01); *F16L 27/10* (2013.01); *F16L 51/02* (2013.01); *F16L 51/03* (2013.01);
(Continued)

(58) Field of Classification Search
CPC   F16L 51/035; F16L 51/03; F16L 27/11; F24J 2/4647; F24J 2/4636; F24J 2/055; H02G 5/002
See application file for complete search history.

(56) References Cited

U.S. PATENT DOCUMENTS 3,241,868 A *  3/1966  Soderberg ............. F16L 51/035
                                                     285/228
4,689,759 A    8/1987  Anouar et al.
(Continued)

FOREIGN PATENT DOCUMENTS

CN    101307957 A    11/2008
DE    12 64 897 B    3/1968
(Continued)

OTHER PUBLICATIONS

Communication dated Dec. 15, 2015 from the Japanese Patent Office in counterpart application No. 2012-171290.
(Continued)

*Primary Examiner* — Jason Lau
(74) *Attorney, Agent, or Firm* — Sughrue Mion, PLLC

(57) ABSTRACT

A solar heat collection tube includes a center metal tube that allows a heat medium to flow therethrough, a glass tube that covers the outer circumference of the center metal tube to form an annular void between the glass tube and the center metal tube, and an absorber configured to absorb a difference in the thermal expansion between the center metal tube and the glass tube. The absorber has a connection cylinder and metal bellows. The metallic bellows are connected in series (Continued)

by the connection cylinder. The bellows are arranged to overlap in the radial direction with the connection cylinder located therebetween.

10 Claims, 3 Drawing Sheets

(51) Int. Cl.
*F16L 51/03* (2006.01)
*F16L 27/10* (2006.01)
*F16L 51/02* (2006.01)
*F24J 2/24* (2006.01)
*F16L 59/065* (2006.01)
*F16L 59/12* (2006.01)
*F24J 2/46* (2006.01)

(52) U.S. Cl.
CPC ............. *F16L 59/065* (2013.01); *F16L 59/12* (2013.01); *F24J 2/24* (2013.01); *F24J 2/465* (2013.01); *F24J 2/4636* (2013.01); *F24J 2002/4681* (2013.01); *Y02E 10/44* (2013.01)

(56) References Cited

U.S. PATENT DOCUMENTS

| 7,013,887 | B2 | 3/2006 | Kuckelkorn et al. |
| 2007/0034204 | A1 | 2/2007 | Kuckelkorn et al. |
| 2010/0205963 | A1* | 8/2010 | Ammar .................. F24J 2/055 60/641.15 |
| 2012/0247456 | A1 | 10/2012 | Sanz et al. |
| 2012/0251336 | A1 | 10/2012 | Sanz et al. |
| 2012/0272950 | A1 | 11/2012 | Sanz et al. |
| 2012/0299289 | A1 | 11/2012 | Martinez Sanz et al. |

FOREIGN PATENT DOCUMENTS

| JP | 58-168846 A | 10/1983 |
| JP | 60-137248 U | 9/1985 |
| JP | 60-51017 B2 | 11/1985 |
| JP | 62-100389 U | 6/1987 |
| JP | 63-312502 A | 12/1988 |
| JP | 2004-251612 A | 9/2004 |
| JP | 2009-174604 A | 8/2009 |
| JP | 2011080719 A | 4/2011 |
| JP | 2012-122693 A | 6/2012 |
| WO | 2011/042578 A1 | 4/2011 |
| WO | 2011/042580 A1 | 4/2011 |
| WO | 2011/098622 A1 | 8/2011 |
| WO | 2011/098623 A1 | 8/2011 |

OTHER PUBLICATIONS

Communication dated Jun. 29, 2015, issued by the European Patent Office in corresponding European Application No. 13825159.0.
Communication dated Jul. 19, 2016, from the Japanese Patent Office in counterpart Japanese application No. 2012-171290.
International Search Report for PCT/JP2013/069780 dated Oct. 8, 2013 [PCT/ISA/210].
International Preliminary Report on Patentability dated Feb. 3, 2015 from the International Bureau in counterpart PCT International Application No. PCT/JP2013/069780.

* cited by examiner

SOLAR HEAT COLLECTION TUBE

CROSS REFERENCE TO RELATED APPLICATIONS

This application is a National Stage of International Application No. PCT/JP2013/069780 filed Jul. 22, 2013, claiming priority based on Japan Patent Application No. 2012-171290 filed Aug. 1, 2012, the contents of all of which are incorporated herein by reference in their entirety.

TECHNICAL FIELD

The present invention relates to a solar heat collection tube, and more particularly, to a solar heat collection tube in which a center metal tube, through which a heat medium flows, and a glass tube, which surrounds the center metal tube so that an annular void is formed between the center metal tube and the glass tube, are connected by an absorber, which absorbs the difference in heat expansion between the center metal tube and the glass tube.

BACKGROUND ART

When the heat medium that flows through a metal tube is heated by heating the metal tube with solar heat to use the heat of the heat medium, contact between the metal tube and the atmosphere transfers the heat of the heated metal tube to the atmosphere. This hinders effective heating of the heat medium. Thus, a glass tube is provided to surround the metal tube so that an annular void is formed between the metal tube and the glass tube. This prevents transfer of heat to the atmosphere from the metal tube, which is heated by solar heat. However, the significant difference in heat expansion rate between the metal tube and the glass tube requires an absorber that absorbs the difference in heat expansion between the metal tube and the glass tube. Since the temperature of the metal tube reaches several hundred degrees, the absorber is made of metal. A bellows is typically used as the absorber. However, when a metal bellows and a glass tube are directly connected, expansion and contraction of the bellows may damage the connection portion between the glass tube and the bellows.

Conventionally, as shown in FIG. 6, a structure has been proposed in which a center metal tube 31 and a glass tube 32 are connected by a bellows 33 and a glass-metal transitional element 34 (see Patent Document 1). The bellows 33 includes an inner end 33a, which is coupled to the center metal tube 31 by a coupling element 35, and an outer end 33b, which is connected to the glass tube 32 by the glass-metal transitional element 34.

PRIOR ART DOCUMENTS

Patent Documents

Patent Document 1: Japanese Laid-Open Patent Publication No. 2004-251612

SUMMARY OF THE INVENTION

Problems that the Invention is to Solve

Of the entire length of the solar heat collection tube, the sunlight is incident on the section of the center metal tube 31 excluding the section that is covered by the bellows 33 and the glass-metal transitional element 34. In Patent Document 1, the glass-metal transitional element 34 is located outside the bellows 33. Thus, the sunlight is incident on the section of the center metal tube 31 excluding the section that is covered by the bellows 33. The bellows 33 has a length that allows the bellows 33 to absorb the maximum difference in heat expansion between the center metal tube 31 and the glass tube 32.

However, when the length of the bellows before expansion and contraction is L, the bellows can change its length by up to about 0.3 L by expansion and contraction.

Expansion or contraction exceeding this length causes plastic deformation and prevents the bellows from returning to the original shape. Since the conventional art includes one bellows, the bellows 33 needs to have a length of 2 L when the maximum difference in heat expansion between the center metal tube 31 and the glass tube 32 is 0.6 L for example. This reduces the active area ratio. The active area ratio refers to the ratio of the length of the area in the center metal tube 31 on which the sunlight is incident to the entire length of the solar heat collection tube.

It is an object of the present disclosure to provide a solar heat collection tube capable of increasing an active area ratio by reducing the region in which incidence of solar heat is blocked by a bellows that absorbs the difference in heat expansion.

Means for Solving the Problems

To achieve the foregoing objective and in accordance with one aspect of the present invention, a solar heat collection tube is provided that includes a center metal tube that allows a heat medium to flow therethrough, a glass tube that covers an outer circumference of the center metal tube such that an annular void is formed between the center metal tube and the glass tube, and an absorber adapted to absorb a difference in heat expansion between the center metal tube and the glass tube. The absorber includes a connection cylinder and a plurality of metal bellows. The connection cylinder connects the bellows in series. The bellows are arranged to overlap in a radial direction with the connection cylinder located between the bellows.

MODES FOR CARRYING OUT THE INVENTION

One embodiment will now be described with reference to FIGS. 1 and 2.

Figure 1:
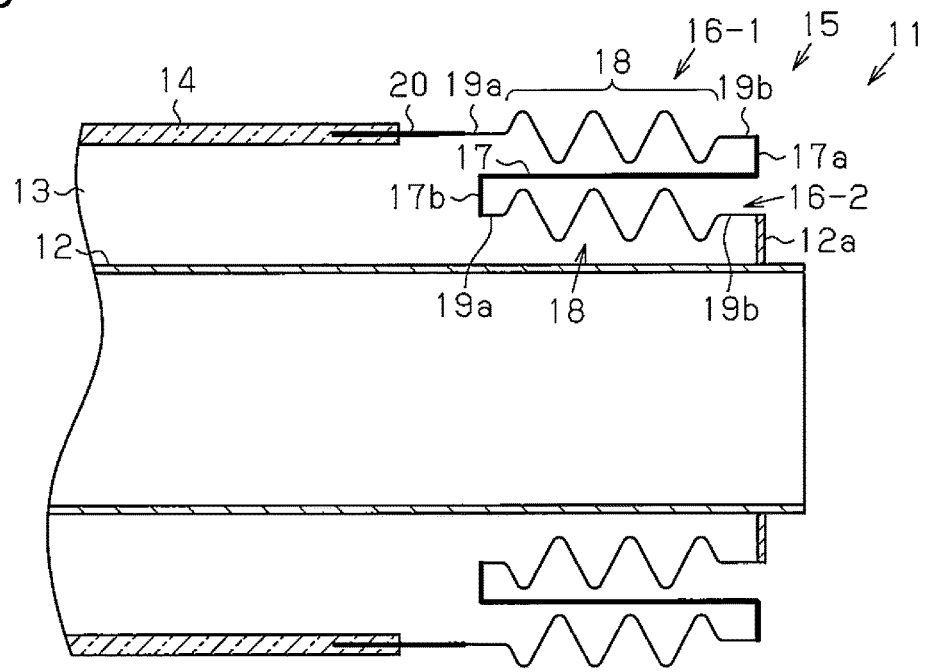
FIG. 1 is a partial cross-sectional view showing a solar heat collection tube of one embodiment.

As shown in FIG. 1, a solar heat collection tube 11 includes a center metal tube 12, a glass tube 14, and a metal absorber 15. A heat medium is allowed to flow through the center metal tube 12. The glass tube 14 covers the outer circumference of the center metal tube 12 such that an annular vacuum void 13, which functions as an annular void, is formed between the center metal tube 12 and the glass tube 14. The absorber 15 absorbs the difference in heat expansion between the center metal tube 12 and the glass tube 14. FIG. 1 shows a section at one end of the solar heat collection tube 11. The solar heat collection tube 11 includes a section at the other end that is structured in a similar (symmetrical) manner.

The glass tube 14 is shorter than the center metal tube 12. The absorber 15 is located between and connected to one end of the center metal tube 12 and one end of the glass tube 14. The center metal tube 12 and the absorber 15 are made of stainless steel. The absorber 15 includes a plurality of (two in this embodiment) bellows 16-1 and 16-2, or first and second bellows 16-1 and 16-2, which are connected in series by a connection cylinder 17. The bellows 16-1 and 16-2 overlap in the radial direction with the connection cylinder 17 located between the bellows 16-1 and 16-2. The state in which "the bellows are connected in series" refers to a state in which the bellows expand and contract simultaneously, and the sum of the expansion amounts or the contraction amounts of the bellows equals to the expansion amount or the contraction amount of the entire absorber. The connection cylinder 17 has substantially the same length as the bellows 16-1 and 16-2 and includes an outer flange 17a in one end and an inner flange 17b in the other end. The outer flange 17a projects radially outward, and the inner flange 17b projects radially inward.

Each of the bellows 16-1 and 16-2 includes an accordion portion 18 and a first cylindrical portion 19a, a second cylindrical portion 19b, The cylindrical portions 19a and 19b are formed at the opposite ends of the accordion portion 18. The accordion portions 18 of the bellows 16-1 and 16-2 have the same length. The first and second cylindrical portions 19a and 19b of the first bellows 16-1 on the radially outer side have the same diameter as the glass tube 14. A Kovar ring 20 connects the first cylindrical portion 19a of the first bellows 16-1 to the glass tube 14. One end of the second cylindrical portion 19b of the first bellows 16-1 is connected, preferably welded, to the outer flange 17a of the connection cylinder 17. Kovar is a ferrous alloy with nickel and cobalt. Among metals, Kovar has a low heat expansion rate that is close to that of hard glass.

The first cylindrical portion 19a of the second bellows 16-2 on the radially inner side is connected, preferably welded, to the inner flange 17b of the connection cylinder 17. One end of the second cylindrical portion 19b of the bellows 16-2 is connected, preferably welded, to the outer circumference of a flange 12a formed on the center metal tube 12. The flange 12a is formed by fixing an annular stainless steel plate to the outer surface of the center metal tube 12 by welding. Thus, in the absorber 15 of the present embodiment, the bellows 16-1 and 16-2 are located radially inward of the glass tube 14. The state of being "located radially inward of the glass tube 14" is not limited to a state in which no part of the radially outermost bellows (the first bellows 16-1 in the present embodiment) is located radially outward of the glass tube 14. In other words, the state of being "located radially inward of the glass tube 14" includes a state in which the radially outermost bellows (the first bellows 16-1 in the present embodiment) is connected to the glass tube 14 to be located at substantially the same radial position as the glass tube 14, more specifically, a state in which the diameter of the first and second cylindrical portions 19a and 19b of the radially outermost bellows is substantially the same as the diameter of the glass tube 14 (thus, part of the accordion portion 18 is located radially outward of the glass tube 14).

Operation of the solar heat collection tube 11 configured as described above will hereafter be described.

In the solar heat collection tube 11, the heat medium introduced into the center metal tube 12 through one end is heated before being discharged from the other end of the center metal tube 12 by the heat transferred from the center metal tube 12. The heated heat medium is used for a heating system, a water heater, and an electric generator, for example.

For example, the solar heat collection tube 11 is arranged such that the center metal tube 12 is located at the focus of a reflecting mirror having a concave reflecting surface. The temperature of the center metal tube 12 increases to about 400° C., and the temperature of the glass tube 14 increases to about 100° C., although the temperatures depend on the performance of the reflecting mirror, the ambient temperature, and the speed of the heat medium moving in the center metal tube 12, for example. The glass tube 14 covers the center metal tube 12, and the annular vacuum void 13 is located between the center metal tube 12 and the glass tube 14. Thus, the heat of the center metal tube 12, which is heated by the sunlight that is incident through the glass tube 14, effectively heats the heat medium flowing through the center metal tube 12.

The heat expansion rate of the first bellows 16-1, which is made of stainless steel, significantly differs from the heat expansion rate of the glass tube 14. However, the force generated by expansion and contraction of the first bellows 16-1 is not directly transferred to the glass tube 14 since the first bellows 16-1 is connected to the glass tube 14 through the Kovar ring 20. This limits damage of the glass tube 14 that would be caused by expansion and contraction of the first bellows 16-1.

Figure 2A:
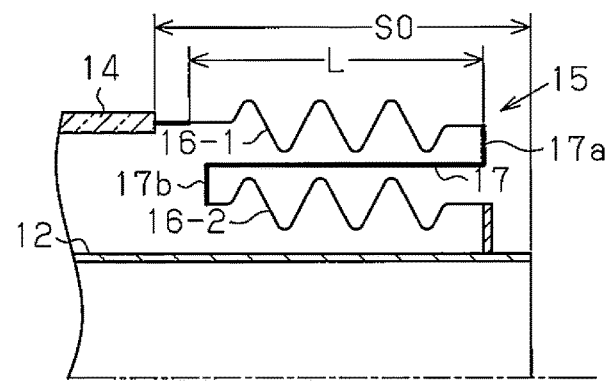
FIG. 2A is a schematic diagram showing operation of the absorber of the solar heat collection tube of FIG. 1.
Figure 2B:
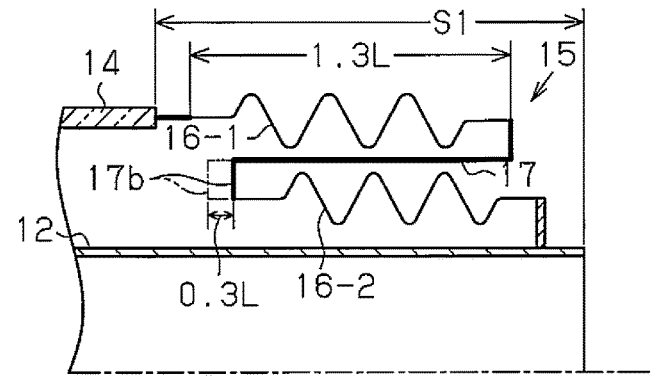
FIG. 2B is a schematic diagram showing operation of the absorber of the solar heat collection tube of FIG. 1.

Operation of the absorber 15 will now be described. The difference in heat expansion between the center metal tube 12 and the glass tube 14, which are heated by the sunlight, applies force to the absorber 15 and thereby expands the absorber 15. FIGS. 2A and 2B show the positional relationships between one end of the center metal tube 12 and one end of the glass tube 14 before heat expansion and after maximum heat expansion, respectively. When the distance between the end of the center metal tube 12 and the end of the glass tube 14 before heat expansion is S0 as indicated in FIG. 2A, and the distance between the end of the center metal tube 12 and the end of the glass tube 14 after maximum heat expansion is S1 as indicated in FIG. 2B, the absorber 15 needs to absorb the value "S1–S0", which is the difference between S1 and S0. When the length of the bellows 16-1 and 16-2 before expansion is L, the length of the bellows 16-1 and 16-2 after maximum expansion is 1.3 L. FIG. 2B schematically shows the positional relationship among the bellows 16-1 and 16-2 and the connection cylinder 17 with reference to the end of the glass tube 14. Since the length of the first bellows 16-1 is 1.3 L, the position of the connection cylinder 17 is moved by 0.3 L toward the flange 12a from the position before the expansion of the first bellows 16-1. The position of the inner flange 17b before the movement of the connection cylinder 17 is indicated by a long dashed double-short dashed line in FIG. 2B. The length of the second bellows 16-2 is 1.3 L. As a result, the length of the absorber 15 increases by 0.6 L, which is the sum of the expansion length 0.3 L of each of the bellows 16-1 and 16-2, from the length before heat expansion of the center metal tube 12 and the glass tube 14. Thus, when the length L of the bellows 16-1 and 16-2 before expansion is set such that 0.6 L is greater than or equal to the value "S1–S0", the absorber 15 can absorb the difference in heat expansion between the center metal tube 12 and the glass tube 14 caused by heat expansion of the center metal tube 12 and the glass tube 14. The length L is half the length of the bellows in a conventional structure in which only one bellows is used. Here, the expansion of the connection cylinder 17 is not considered.

The present embodiment achieves the following advantages.

(1) The solar heat collection tube 11 includes the center metal tube 12, which allows a heat medium to flow therethrough, the glass tube 14, which covers the outer circumference of the center metal tube 12 such that the annular vacuum void 13 is formed between the center metal tube 12 and the glass tube 14, and the absorber 15, which absorbs the difference in heat expansion between the center metal tube 12 and the glass tube 14. In the absorber 15, the connection cylinder 17 connects the two metal bellows 16-1 and 16-2 in series. In addition, the bellows 16-1 and 16-2 are arranged to overlap in the radial direction with the connection cylinder 17 located between the bellows 16-1 and 16-2. Thus, after heat expansion, the expansion amount of the absorber 15 is the sum of the expansion amount of each of the bellows 16-1 and 16-2. Further, bellows of the same length are used as the two bellows 16-1 and 16-2, and the two bellows are arranged to overlap in the radial direction. Thus, of the length of the absorber 15, the length of the bellows section equals to the length of one bellows. This reduces the region of the absorber 15 in which incident of the sunlight is blocked by the bellows 16-1 and 16-2, thereby increasing the active area ratio.

(2) There are two bellows 16-1 and 16-2. This facilitates the manufacturing compared to a structure that includes three or more bellows.

(3) The bellows 16-1 and 16-2 are located radially inward of the glass tube 14. The center metal tube 12 is connected to the radially innermost second bellows 16-2. This allows the connection cylinder 17 to move easily without interfering with the flange 12a, which connects the second bellows 16-2 to the center metal tube 12, when the bellows 16-1 and 16-2 expand and move the connection cylinder 17. In addition, the solar heat collection tube 11 requires a smaller installation space than a solar heat collection tube 11 that includes a glass tube 14 of the same diameter and bellows 16-1 and 16-2 that are located radially outward of the glass tube 14.

(4) The center metal tube 12 is made of stainless steel and can be connected by welding. Thus, airtight sealing can be easily achieved at the connection section, thereby ensuring vacuum in the annular vacuum void 13. In addition, stainless steel tubes have high corrosion resistance and strength and are used in various fields. Stainless steel tubes are readily available and cost-effective.

(5) The metal second bellows 16-2 is welded to the flange 12a of the center metal tube 12. The accordion portion 18 of the second bellows 16-2 has a greater diameter than the center metal tube 12. Thus, one of the second bellows 16-2 and the center metal tube 12 needs to include a flange so as to be welded to each other. In the present embodiment, the center metal tube 12 includes the flange 12a, This facilitates the arrangement of the flange 12a compared to a structure in which the second bellows 16-2 includes the flange 12a.

(6) The connection cylinder 17 is arranged between the first bellows 16-1 and the second bellows 16-2. This allows the bellows 16-1 and 16-2 to expand and contract without their accordion portions 18 interfering with each other.

The present invention is not limited to the above described embodiment, but may be embodied as follows, for example.

Figure 3:
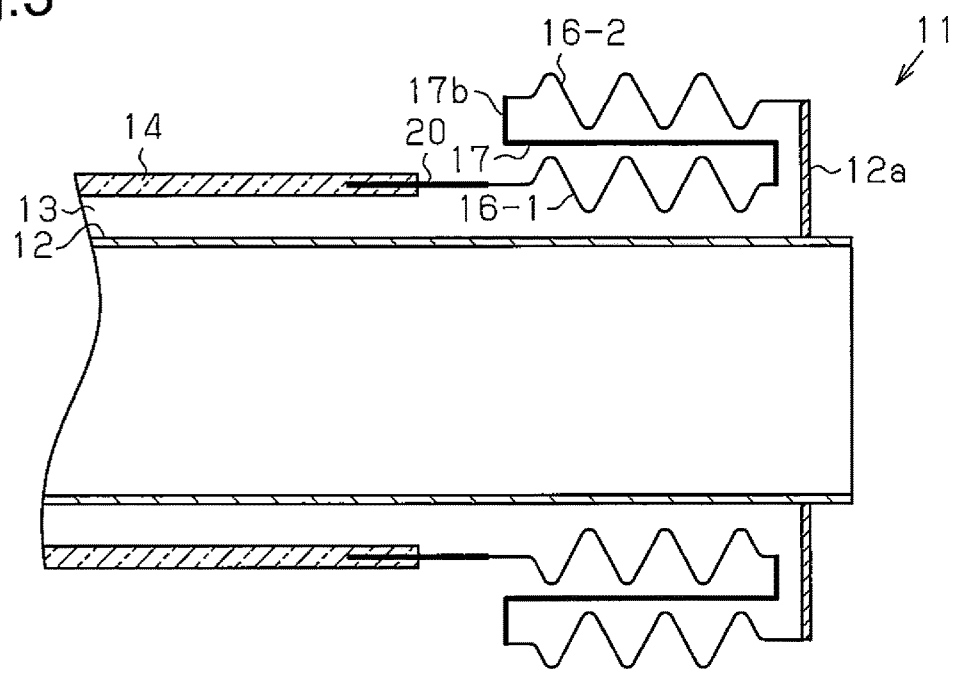
FIG. 3 is a partial cross-sectional view showing a solar heat collection tube of another embodiment.

In the absorber 15, the bellows 16-1 and 16-2 may be located radially outward of the glass tube 14. The state of being "located radially outward of the glass tube 14" is not limited to a state in which no part of the radially innermost bellows (the first bellows 16-1 in the present structure) is located radially inward of the glass tube 14. In other words, the state of being "located radially outward of the glass tube 14" includes a state in which the radially innermost bellows (the first bellows 16-1 in the present structure) is connected to the glass tube 14 to be located at substantially the same radial position as the glass tube 14, more specifically, a state in which the first and second cylindrical portions 19a and 19b of the radially innermost bellows have substantially the same diameter as the glass tube 14 (thus, part of the accordion portion 18 is located radially inward of the glass tube 14). Specifically, as shown in FIG. 3, the first bellows 16-1, which is connected to the glass tube 14 by the Kovar ring 20, is located on the radially inner side, and the second bellows 16-2, which is connected to the center metal tube 12, is located on the radially outer side. In this structure, even if there are many bellows, a desired number of bellows can be easily arranged without increasing the difference in diameter between the glass tube 14 and the center metal tube 12.

Figure 4:
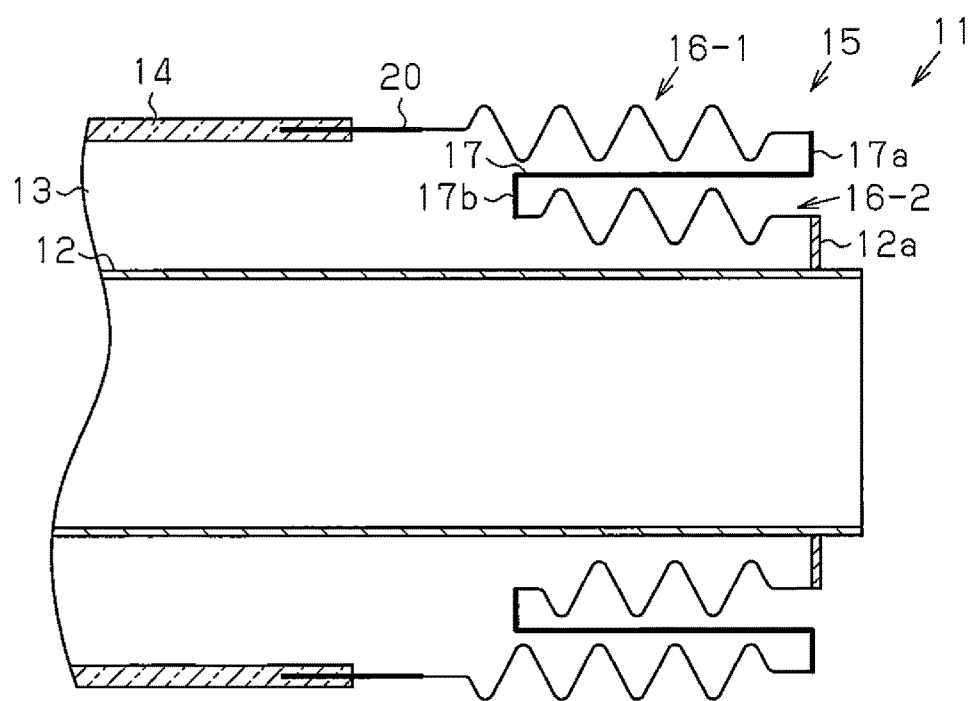
FIG. 4 is a partial cross-sectional view showing a solar heat collection tube of a further embodiment.

Bellows of different lengths may be used as the bellows 16-1 and 16-2 of the absorber 15. For example, as shown in FIG. 4, the radially outer bellows 16-1 may be longer than the radially inner bellows 16-2. When a plurality of bellows are arranged to overlap in the radial direction, the radially outer bellows, that is, the bellows having a large diameter, may have a high strength and a large expansion and contraction amount. Thus, increasing the length of the radially outer bellows 16-1 to be greater than the length of the radially inner bellows 16-2 improves the heat expansion absorption capacity of the absorber 15 without changing the length of the absorber 15.

Figure 5:
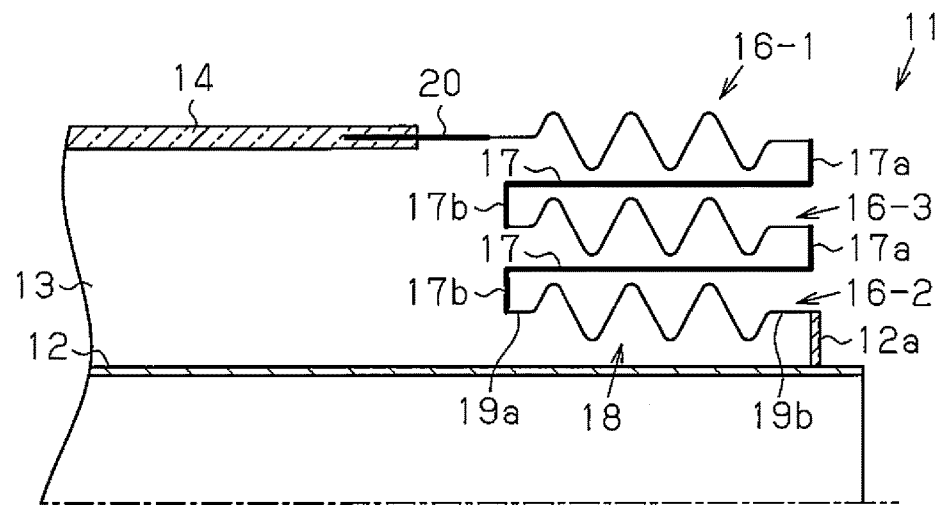
FIG. 5 is a partial cross-sectional view showing a solar heat collection tube of a further embodiment.
Figure 6:
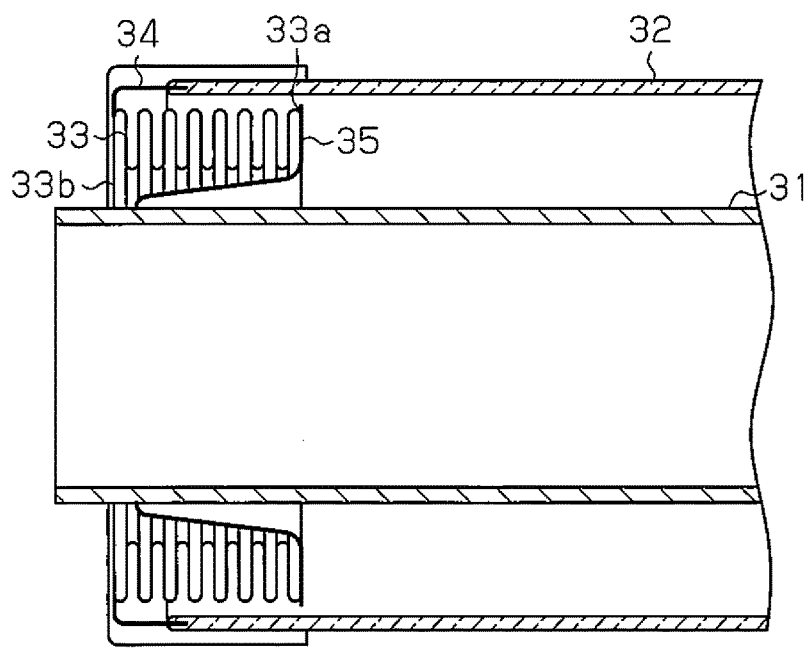
FIG. 6 is a partial cross-sectional view showing a conventional solar heat collection tube.

The number of the bellows of the absorber 15 is not limited to two and may be three or more. For example, when three bellows 16-1, 16-2 and 16-3 are used, the three bellows 16-1, 16-2 and 16-3 and two connection cylinders 17 are arranged to overlap alternately as shown in FIG. 5. In this structure, the expansion and contraction amount of the absorber 15 is the sum of the expansion and contraction amounts of the bellows 16-1, 16-2 and 16-3. Thus, the absorber 15 that includes the length of one bellows achieves three times as much expansion and contraction amount as one bellows.

In each of three bellows 16-1, 16-2 and 16-3, the diameter of the first and second cylindrical portions 19a and 19b does not have to be equal to the diameter at the midpoint between a peak and a valley of the accordion portion 18 and may be longer or shorter.

In each of three bellows 16-1, 16-2 and 16-3, the first and second cylindrical portions 19a and 19b do not have to be equal in diameter. The first cylindrical portion 19a may have a larger or smaller diameter than the second cylindrical portion 19b.

In each of three bellows 16-1, 16-2 and 16-3, folds of the accordion portion 18 are not limited to be V-shaped and may be U-shaped.

Instead of forming the flange 12a on the center metal tube 12 to connect the bellows 16-1 and 16-2 and the center metal tube 12, the second cylindrical portions 19b of the bellows 16-1 and 16-2 may include a flange that is connected (preferably welded) to one end of the center metal tube 12.

The center metal tube 12, the bellows 16-1, 16-2 and 16-3, and the connection cylinder 17 may be made of metals other than stainless steel.

The annular void is not limited to the annular vacuum void 13. For example, the annular void may be filled with a gas having a less heat conductivity than the air at a pressure that is greater than or equal to the normal atmospheric pressure. This provides the same degree of heat conductivity as a vacuum void. The term "vacuum void" is not limited to a perfect vacuum void and includes a void that is filled with a gas having a pressure lower than the normal atmospheric pressure.

The invention claimed is:

1. A solar heat collection tube comprising:
a center metal tube that allows a heat medium to flow therethrough;
a glass tube that covers an outer circumference of the center metal tube such that an annular void is formed between the center metal tube and the glass tube; and
an absorber adapted to absorb a difference in heat expansion between the center metal tube and the glass tube, wherein
the absorber includes a connection cylinder and a plurality of metal bellows, wherein the connection cylinder connects the bellows in series, and
the bellows are arranged to overlap in a radial direction with the connection cylinder located between the bellows,
wherein
the connection cylinder includes an outer flange, which projects radially outward from one end of the connection cylinder, and an inner flange, which projects radially inward from the other end of the connection cylinder, and
one of the bellows that is located on a radially outer side is connected to the outer flange, and another of the bellows that is located on a radially inner side is connected to the inner flange.

2. A solar heat collection tube comprising:
a center metal tube that allows a heat medium to flow therethrough;
a glass tube that covers an outer circumference of the center metal tube such that an annular void is formed between the center metal tube and the glass tube; and
an absorber adapted to absorb a difference in heat expansion between the center metal tube and glass tube, wherein
the absorber includes a connection cylinder and a plurality of metal bellows, wherein the connection cylinder connects the bellows in series, and
the bellows are arranged to overlap in a radial direction with the connection cylinder located between the bellows,
wherein the plurality of bellows is two bellows.

3. The solar heat collection tube according to claim 1, wherein the bellows are located radially inward of the glass tube.

4. A solar heat collection tube comprising:
a center metal tube that allows a heat medium to flow therethrough;
a glass tube that covers an outer circumference of the center metal tube such that an annular void is formed between the center metal tube and the glass tube; and
an absorber adapted to absorb a difference in heat expansion between the center metal tube and glass tube, wherein
the absorber includes a connection cylinder and a plurality of metal bellows, wherein the connection cylinder connects the bellows in series, and
the bellows are arranged to overlap in a radial direction with the connection cylinder located between the bellows,
wherein the bellows are located radially outward of the glass tube.

5. The solar heat collection tube according to claim 1, wherein the one of the bellows that is located on the radially outer side is longer than the another of the bellows that is located on the radially inner side.

6. The solar heat collection tube according to claim 2, wherein one of the bellows that is located on a radially outer side is longer than another of the bellows that is located on a radially inner side.

7. The solar heat collection tube according to claim 3, wherein the one of the bellows that is located on the radially outer side is longer than the another of the bellows that is located on the radially inner side.

8. The solar heat collection tube according to claim 4, wherein one of the bellows that is located on a radially outer side is longer than another of the bellows that is located on a radially inner side.

9. The solar heat collection tube according to claim 1, wherein the absorber includes a first end connected to the center metal tube and a second end connected to the glass tube.

10. The solar heat collection tube according to claim 1, wherein the absorber is configured such that the bellows expand or contract simultaneously, and the sum of expansion amounts or contraction amounts of the bellows equals to an expansion amount or a contraction amount of the entire absorber.

* * * * *